United States Patent

Parkes

[15] 3,653,017
[45] Mar. 28, 1972

[54] LIQUID LEVEL INDICATOR SYSTEMS

[72] Inventor: Eric Bernard Parkes, Birmingham, England

[73] Assignee: Joseph Lucas (Industries) Limited, Birmingham, England

[22] Filed: Dec. 3, 1969

[21] Appl. No.: 881,761

[30] Foreign Application Priority Data

Dec. 20, 1968    Great Britain......................60,802/68

[52] U.S. Cl. .........................................340/244 C, 204/280
[51] Int. Cl. .....................................................G08b 21/00
[58] Field of Search ..................204/282, 283, 290; 340/244, 340/59

[56] References Cited

UNITED STATES PATENTS

| | | | |
|---|---|---|---|
| 1,862,244 | 6/1932 | Stuart.....................................204/283 |
| 1,433,017 | 10/1922 | McKee...................................204/290 |
| 2,944,956 | 7/1960 | Blue et al...............................204/282 |

*Primary Examiner*—John W. Caldwell
*Assistant Examiner*—H. Samuel Cohen
*Attorney*—Holman & Stern

[57] ABSTRACT

A liquid level indicator system for indicating the level of a conductive liquid in a reservoir includes a probe, at least a portion of the probe which is immersed in the liquid when the liquid level is at or above a predetermined level being coated with a layer of material which is absorbent to the conductive liquid so that a true indication of the liquid level in the reservoir is obtained.

2 Claims, 1 Drawing Figure

PATENTED MAR 28 1972
3,653,017
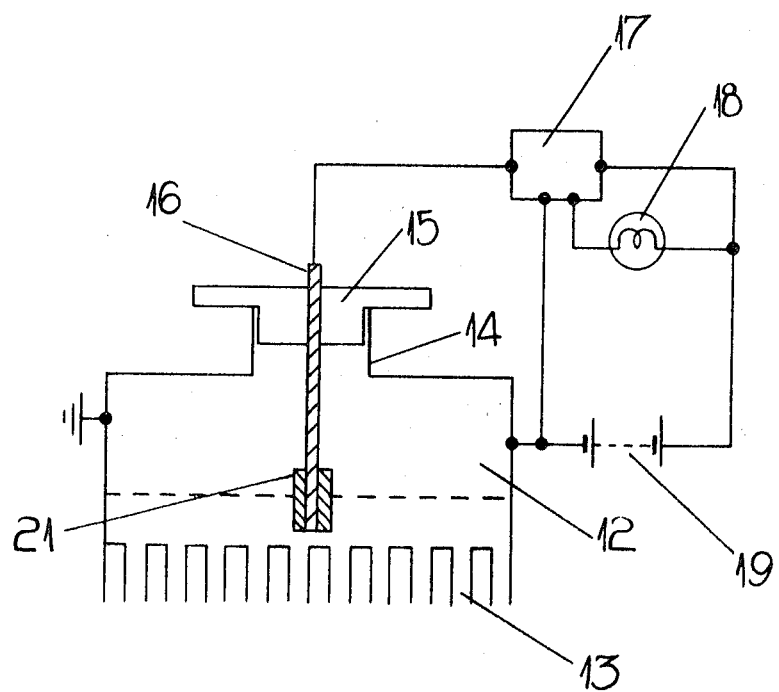
INVENTOR
Eric Bernard Parkes
BY Holman, Glascock,
   Downing & Seebold
ATTORNEYS

LIQUID LEVEL INDICATOR SYSTEMS

This invention relates to liquid level indicator systems, for indicating the level of conductive liquid in a reservoir, of the kind including a conductive probe, a conductive terminal, means for producing a potential difference between said probe and said terminal, and indicator means for indicating the absence of current flow between said probe and said terminal, the arrangement being such that when the level of the conductive liquid is at or above a predetermined level the liquid bridges said probe and said terminal and current flows between the probe and the terminal, whereas when the liquid level falls below said predetermined level said probe and said terminal are insulated from one another and no current flows, said indicator means then giving an indication that the liquid level is below said predetermined level.

In systems of the kind specified it is found that when the liquid level is at or above said predetermined level, a layer of gas bubbles can form on the probe, thereby insulating the probe from said terminal and causing a false indication of low liquid level to be given. It is an object of the present invention to minimize this problem.

In a system of the kind specified, a portion of the probe which is immersed in the liquid when the liquid level is at or above the predetermined level is coated with a layer of material which is absorbent to said conductive liquid.

The accompanying drawing is a diagrammatic representation of a vehicle radiator embodying a liquid level indicator system according to one example of the invention.

Referring to the drawing, the radiator 11 of the vehicle includes a header tank 12 positioned above the radiator core 13. The header tank 12 includes a neck 14 through which water can be inserted into the radiator, the neck 14 being closed by a cap 15, the desired water level within the header tank 12 being indicated by a chain dotted line. Extending through the cap 15 into the header tank 12, but insulated from the walls of the tank 12 is a conductive probe 16 which terminates at its lower end, fractionally below the minimum desired water level. The probe 16 is electrically connected to a control unit 17 which derives its power from the vehicle battery and which controls an indicator lamp 18. A potential difference exists between the probe 16 and the wall of the header tank 12 and the control unit 17 is such that when the electrical resistance between the probe 16 and the wall of the header tank 12 is at or above a predetermined level, then the lamp 18 is illuminated. In use, when the water level in the header tank 12 is at or above the desired level then the water bridges the probe 16 and the wall of the header tank 12, reducing the resistance between the probe 16 and the wall of the header tank 12 to below said predetermined value, so that the lamp 18 is extinguished. However, when the water level in the header tank 12 drops below the desired level the probe 16 and the wall of the header tank 12 are no longer bridged by the water, and so the resistance increases above the predetermined value and the lamp 18 is illuminated to give an indication of low water level in the radiator.

It is found that in use, particularly when an ethylene glycol anti-freeze is added to the water in the radiator, a layer of gas bubbles tends to form around the immersed portion of the probe 16. The layer of bubbles on the immersed portion of the probe 16 tends to insulate the probe 16 from the water and hence the wall of the header tank 12 thereby raising the electrical resistance between the probe 16 and the wall of the header tank 12, and causing the lamp 18 to be illuminated, even though the water level within the radiator is satisfactory. Thus, a false indication of the water level in the radiator can be given.

In order to minimize the risk of such a false reading being given, due to the formation of a layer of gas bubbles on the probe 16, part or all of the immersed portion of the probe 16 has attached thereto a layer of material which absorbs water. For example, the end of the probe 16 can be enclosed in a felt sleeve 21 which becomes impregnated with water, and it has been found that the provision of the absorbent layer on the end of the probe 16 is effective in inhibiting the formation of an insulating layer of bubbles.

Having thus described my invention what I claim as new and desire to secure by Letters Patent is:

1. A liquid level indicator system for indicating the level of conductive liquid in a reservoir, the system including a conductive probe; a conductive terminal; said probe and said terminal being arranged so that when the level of the conductive liquid is at or above a predetermined level the liquid bridges said probe and said terminal, whereas when the liquid level falls below said predetermined level and said probe and said terminal are insulated from one another, and a portion of the probe which is immersed in the liquid when the liquid level is at or above the predetermined level being coated with a layer of material which is absorbent to said conductive liquid; a power source for producing a potential difference between said probe and said terminal so that when the level of the conductive liquid is at or above the predetermined level current flows between the probe and the terminal, but no current flows there between when the liquid falls below said predetermined level; and indicator means for indicating the absence of current flow between said probe and said terminal, said indicator means thereby giving an indication when the liquid level is below said predetermined level.

2. A system as claimed in claim 1 wherein the layer of absorbent material is a felt sleeve.

* * * * *